Figure 1:
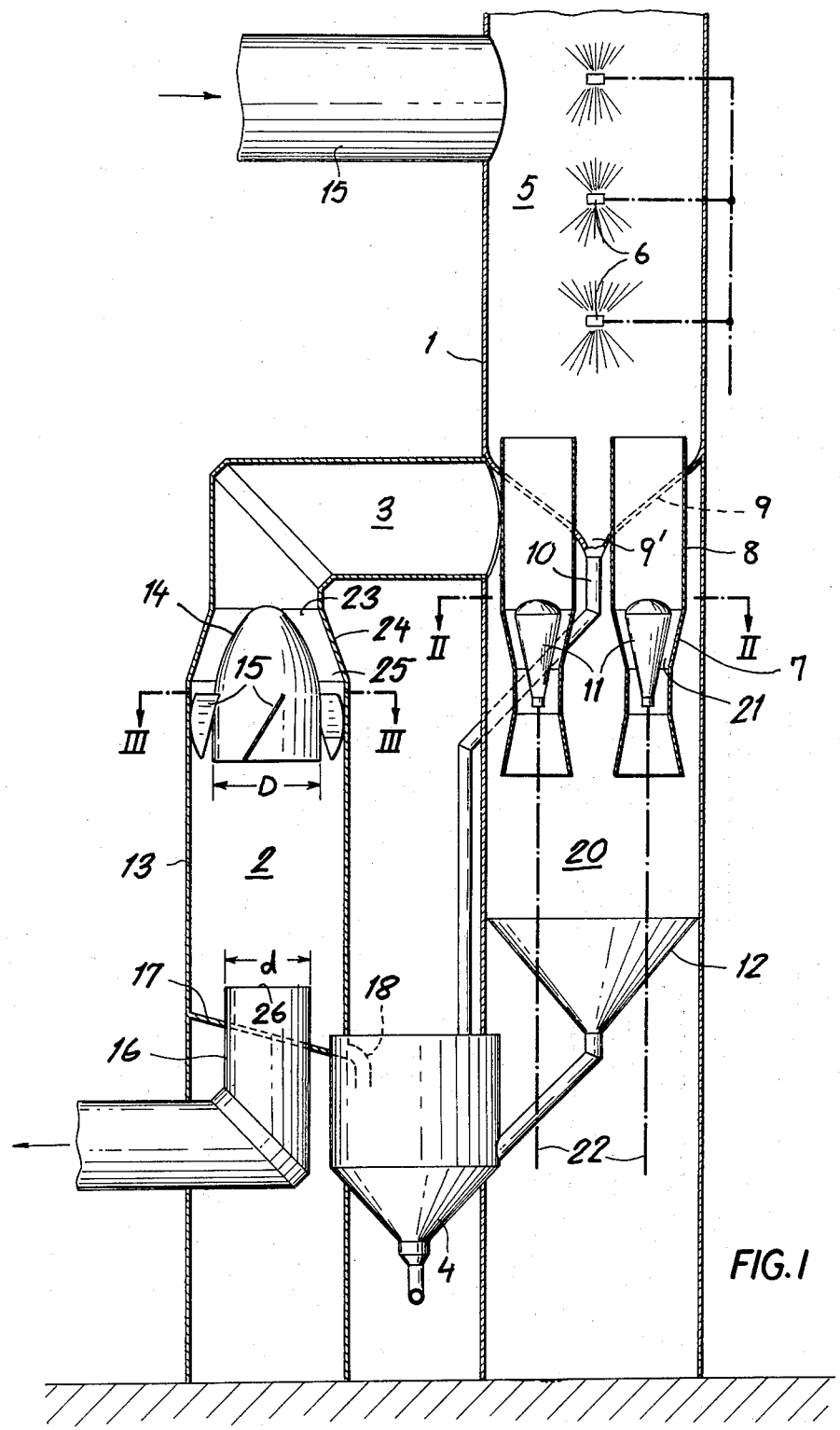

United States Patent [19]
Hausberg et al.

[11] 3,820,307
[45] June 28, 1974

[54] APPARATUS FOR SCRUBBING WASTE GASES

[76] Inventors: Gerhard Hausberg, Graf-Bernadottestrasse 48, 43, Essen-Bredeney; Karl-Rudolf Hegemann, Am. krausen. Bau chen. 1-3, 43, Essen-Bergerhausen, both of Germany

[22] Filed: Oct. 12, 1971

[21] Appl. No.: 188,558

[30] Foreign Application Priority Data
Oct. 10, 1970 Germany............................ 2049901

[52] U.S. Cl................ 55/226, 55/238, 55/257, 55/319, 55/457, 261/116, 261/117, 261/DIG. 54
[51] Int. Cl.................. B01d 47/06, B01d 47/10
[58] Field of Search ............ 55/226, 238, 257, 319, 55/457, 223, 21, 258, 260, 344, 418; 261/115, 116, 117, 118, DIG. 54; 266/31; 75/1, 35

[56] References Cited
UNITED STATES PATENTS
3,140,163  7/1964  Hausberg...................... 261/117 X
3,167,413  1/1965  Kiekens et al. ....................... 55/225
3,199,267  8/1965  Hausberg............................. 55/210
3,369,344  2/1968  Jackson et al. ....................... 55/20
3,584,440  6/1971  Vigil .............................. 261/116 X
3,690,044  9/1972  Boresta .......................... 261/112 X Primary Examiner—Dennis E. Talbert, Jr.
Attorney, Agent, or Firm—Karl F. Ross; Herbert Dubno

[57] ABSTRACT

Waste gases from a Bessemer converter or the like are conducted downwardly through a wash tower containing several spray heads above a parallel array of constricted nozzles forming annular gaps to accelerate the flow of the wetted gases from an upper to a lower compartment. Just below a partition separating the two compartments, a lateral outlet for the expanding gases lies above the level of the lower nozzle ends whereby the gas flow undergoes a change of direction with resulting separation of entrained droplets from the gas. The flow then passes downwardly through an adjoining water separator in the form of a vertical cylinder with a central deflector separated from the peripheral wall by an annular clearance containing vanes for imparting swirling motion to the gas stream.

10 Claims, 3 Drawing Figures

APPARATUS FOR SCRUBBING WASTE GASES

Our present invention relates to an apparatus for scrubbing particle-laden waste gases, such as those of a Bessemer converter, before releasing them into the atmosphere.

In commonly owned U.S. Pat. Nos. 3,140,163 and 3,199,267 (Hausberg), systems for scrubbing or cleaning waste gases have been disclosed wherein the gases are conducted through a wash tower having an upstream compartment with several spray heads, this compartment being separated from a downstream compartment by a transverse partititon traversed by one or more nozzles which form throttled passages for the wetted gases. These passages are generally in the form of annular gaps defined by the nozzles and by respective inserts of smaller diameter received therein as disclosed in later Hausberg patent. Each insert coacts with a constricted waist portion of the associated nozzle whereby an adjustment of the gap width is possible upon relative axial movement of the two bodies. Such adjustment, as likewise taught in that second patent, may be used to maintain a substantially constant pressure differential across the gap.

In flowing through the annular gap, the wetted and particle-laden gases are accelerated so as to develop a certain turbulence resulting in intimate mixing of the two phases. Upon entering the downstream compartment, the gases expand with resulting precipitation of their moisture on the entrained solids which are thereby washed from the gas stream, e.g. with the aid of a baffle-type water separator near the outlet of the tower.

In the case of very dusty waste gases, such as those coming from a converter, the removal of the required large volume of water from the gases in a water separator becomes more difficult. The necessary enlargement of the gas passage or passages through the partition impedes an accurate training of the exiting gas flow onto a baffle plate; besides, the capacity of the water separator must be considerably increased to accommodate the volume.

The general object of our present invention is to provide an improved apparatus for the purpose set forth which is of compact construction and high efficiency in scrubbing even large quantities of highly dust-laden gases.

The object is realized, in conformity with our present invention, by directing the flow of wetted gases downwardly within the wash tower, in contrast to the upward flow described in the above-identified Hausberg patents, and disposing the outlet of the tower laterally beneath the partition above the level of the lower nozzle and whereby the gas stream exiting from the nozzle or nozzles must undergo a change of direction before reaching the outlet. This change of direction separates some of the entrained droplets, owing to their greater inertia, from the gas stream and allows them to be collected at the bottom of the tower; the gas then enters a water separator which is positioned alongside the tower and has an entrance port connected to the tower outlet by a generally horizontal conduit.

In view of the preliminary removal of part of the water within the tower itself, the external water separator may be relatively small. Advantageously, pursuant to a further feature of our invention, this water separator comprises a cylindrical shell into which the entrance port opens downwardly above an upwardly opening exit port in line therewith. Interposed between these two ports within the shell is a central deflector forming with the peripheral cylindrical shell an annular channel through which the radially outwardly deflected gas stream may reach the exit port. Underneath the deflector, which is preferably an upwardly tapering projectile-shaped body seated in an upwardly converging neck of the cylinder, the gases again expand with resulting precipitation of their residual moisture on the cylinder walls along which the water flows onto a runoff surface below the level of the exit port. This port should have a diameter less than that of the circular base of the deflector body so as not to intercept any droplets descending from the annular channel.

The gas stream passing through the annular channel between the cylinder and the deflector may be set in swirling motion with the aid of inclined vanes in that channel, thereby further increasing the efficiency of separation by virtue of the directional changes involved. These vanes may also conveniently serve as a means for supporting the deflector body on the inner cylinder walls.

Figure 2:
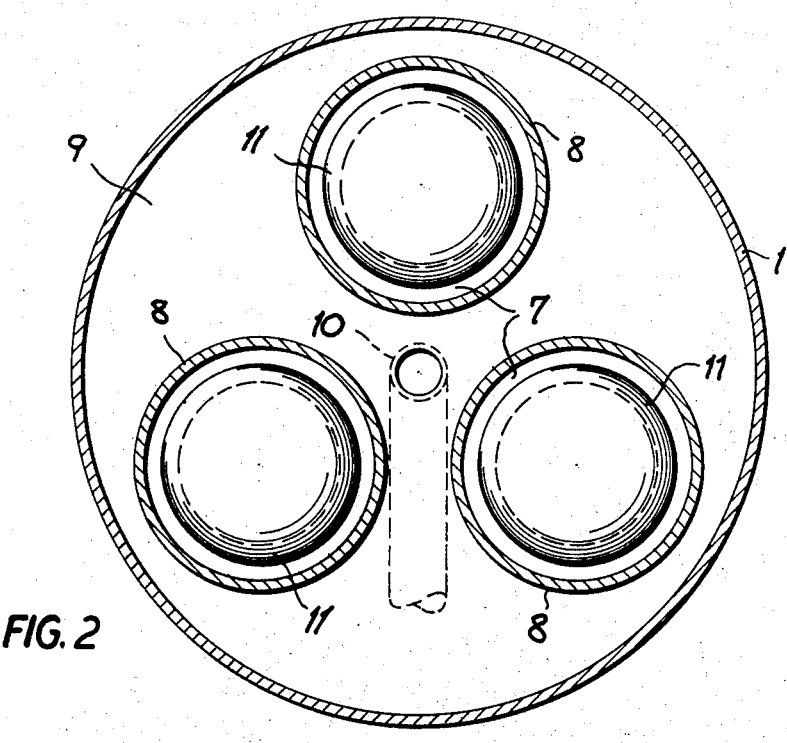
Figure 3:
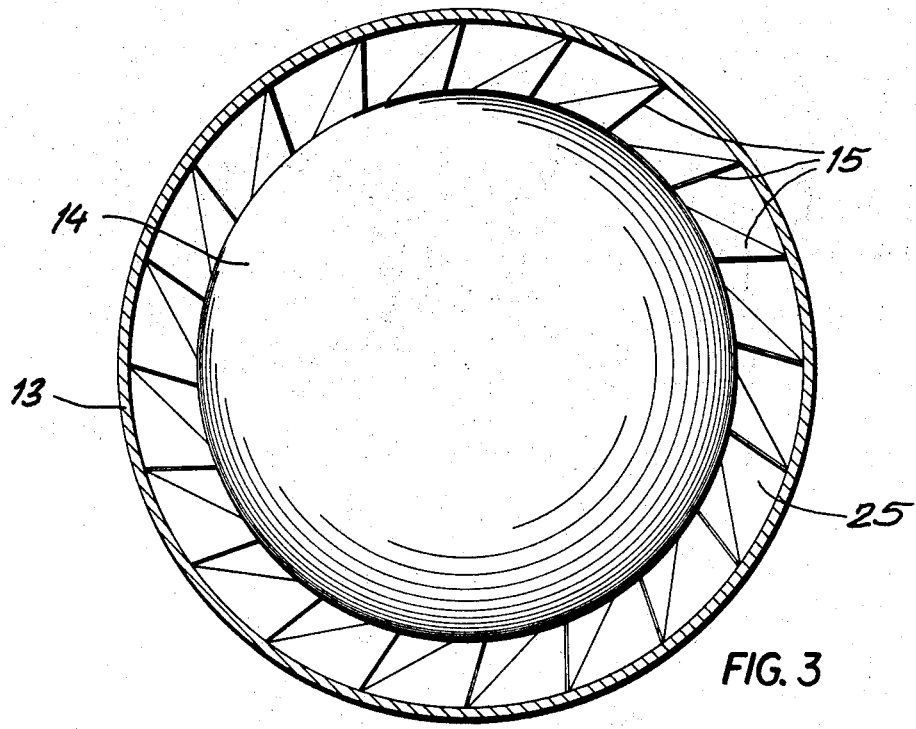

The above and other features of our invention will be described in detail hereinafter with reference to the accompanying drawing in which:

FIG. 1 is a somewhat diagrammatic sectional elevational view of a scrubbing apparatus according to our invention; and FIGS. 2 and 3 are cross-sectional views, drawn to a larger scale, taken on the lines II—II and III—III, respectively, of FIG. 1.

The apparatus shown in the drawing comprises a cylindrical tower 1 provided at its top with an inlet duct 19 through which dust-laden washed gases, e.g. from a Bessemer converter, are delivered to it. These gases are wetted in an upper compartment 5 of the tower by three spray heads 6 which are stacked along the tower axis above a partition 5 separating the upstream compartment 5 from a lower or downstream compartment 20. Partition 9 is of substantially circular shape with a downwardly pointing apex 9'; a drain pipe 10 leads from that apex to a tank 4 at the bottom of the installation from which the spent water may be recirculated by a nonillustrated pump to the spray heads 6.

Partition 9 is traversed by three parallel nozzles 8, mounted thereon in a triangular array as best seen in FIG. 2, which have constricted portions 7 defining annular gaps 21 with respective inserts 11 of downwardly tapering configuration. These inserts are supported on stems 22 which may be axially shiftable, e.g. electromagnetically, to vary the effective widths of the respective gaps. Reference in this connection may be made to our application Ser. No. 188,557 of even date entitled "Apparatus for Cleaning Flue Gases of Blast Furnaces", now U.S. Pat. No. 3,726,065, in which we have described circuitry for varying the position of the accelerating inserts 11 under the control of upstream and downstream pressure sensors to maintain either a substantially constant output pressure or (in the case of abnormally low input pressures) a substantially constant pressure differential across the partition.

A horizontal outlet duct 3 extends laterally from the tower 1 at a location just below the base of partition 9 but above the level of the lower ends of nozzles 8. It will be seen that the greater part of this outlet lies also above the level of apex 9'. Thus, the gases clearing the gaps 21 (or any one of these gaps if only one nozzle is operative at a time as likewise described in our above-identified copending application) are forced to deviate sharply from their downward path in order to reach the outlet 3; droplets of water together with adhering dust particles, continuing downwardly, are intercepted by a' collecor trough 12 also feeding the tank 4. Naturally the solids swept into the tank must be removed by sedimentation, vaporization or other means if the water thereof is to be recirculated.

Outlet duct 3 leads to a water separator 2 alongside tower 1, comprising a cylindrical shell 13 with a downwardly open entrance port 23 merging into a frustoconical neck 24. A deflector 14, projecting into this neck, has an upwardly tapering body of streamlined bullet-shaped profile coaxially mounted in the shell 13 with the aid of a set of peripheral vanes 15 which are obliquely positioned to give rise to a swirling gas stream within an annular channel 25 defined by the shell and the deflector. The circular base of body 14 has a diameter D which is larger than the diameter $d$ of an upwardly open exit port 26 coaxially aligned therewith, port 26 being formed by an elbow-shaped pipe 16 traversing a sloping partition 17 which forms a run-off surface discharging the accumulating water through a tube 18 into the tank 4.

The scrubbed gases leaving the pipe 16 may be released into the atmosphere, e.g. through a smokestack.

An optimum supply pressure for the operation of the water separator 2 may be maintained by the above-mentioned pressure-regulating system disclosed and claimed in our copending application of even date.

We claim:

1. An apparatus for scrubbing waste gases, comprising:
   a wash tower with an inlet for waste gases and an outlet for washed gas;
   partition means in said tower dividing same into an upper compartment communicating with said inlet and a lower compartment communicating with said outlet;
   spray means in said upper compartment for wetting the incoming waste gases descending from said inlet;
   nozzle means in said partition means forming at least one throttled passage for the wetted gases to said lower compartment, said nozzle means having a lower end spaced from said partition means, said outlet being located laterally on said tower above the level of said lower end whereby a gas stream exiting from said nozzle means undergoes a change of direction before reaching said outlet;
   collector means in said lower compartment for droplets separating from said gas stream; and
   a water separator alongside said tower having an entrance port connected to said outlet by a generally horizontal conduit.

2. An apparatus as defined in claim 1 wherein said water separator comprises a vertical cylinder, said entrance port opening centrally downwardly into said cylinder above an upwardly open exit port in line therewith, and a central deflector in said cylinder between said ports, said deflector forming with the peripheral wall of said cylinder an annular channel giving access to said exit port.

3. An apparatus as defined in claim 2 wherein said deflector is an upwardly tapering body with a circular base of a diameter larger than that of said exit port, said cylinder having an upwardly converging neck merging into said entrance port.

4. An apparatus as defined in claim 2, further comprising a set of inclined vanes in said channel imparting a swirling motion to the gas stream passing therethrough.

5. An apparatus as defined in claim 2, further comprising a run-off surface for separated water in said cylinder below the level of said exit port.

6. An apparatus as defined in claim 5, further comprising common drain means connected with said collector means in said tower and with said run-off surface in said cylinder.

7. An apparatus as defined in claim 1 wherein said nozzle means comprises a plurality of parallel nozzles arrayed in said tower about a central vertical axis.

8. An apparatus as defined in claim 7 wherein said spray means comprises a plurality of spray heads stacked along said axis.

9. An apparatus as defined in claim 7 wherein said nozzles are provided with tapering inserts defining annular gaps with constricted portions of said nozzles, said gaps being disposed at a level below that of said outlet.

10. An apparatus as defined in claim 7 wherein said partition means comprises a generally conical wall centered on said axis with a downwardly facing apex, said outlet lying at least partly above the level of said apex.

* * * * *

UNITED STATES PATENT AND TRADEMARK OFFICE
CERTIFICATE OF CORRECTION

PATENT NO. : 3,820,307
DATED : 28 June 1974
INVENTOR(S) : Gerhard HAUSBERG et al It is certified that error appears in the above–identified patent and that said Letters Patent are hereby corrected as shown below:

In the heading, after line [76] insert:

-- [73] Assignee: Gottfried Bischoff Bau kompl. Gasreinigungs- und Wasserrückkühlanlagen Kommanditgesellschaft --

Signed and Sealed this

Twenty-third Day of November 1976

[SEAL]

Attest:

RUTH C. MASON
*Attesting Officer*

C. MARSHALL DANN
*Commissioner of Patents and Trademarks*